United States Patent
Pöschl et al.

(10) Patent No.: US 11,447,377 B2
(45) Date of Patent: *Sep. 20, 2022

(54) MULTI-FIELD SCANNING TOOLS IN MATERIALS HANDLING VEHICLES

(71) Applicant: Crown Equipment Corporation, New Bremen, OH (US)

(72) Inventors: Franz Pöschl, Erding (DE); Timothy A. Wellman, Coldwater, OH (US); Stefan Hanneman, Munich (DE); Martin Okroy, Munich (DE); Stefan Sauer, Munich (DE); Jess Donnely, Matamata (NZ)

(73) Assignee: Crown Equipment Corporation, New Bremen, OH (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/013,909

(22) Filed: Sep. 8, 2020

(65) Prior Publication Data

US 2020/0399104 A1 Dec. 24, 2020

Related U.S. Application Data

(63) Continuation of application No. 15/686,597, filed on Aug. 25, 2017, now Pat. No. 10,800,640.
(Continued)

(51) Int. Cl.
*B66F 9/075* (2006.01)
*B66F 17/00* (2006.01)
(Continued)

(52) U.S. Cl.
CPC .......... *B66F 9/0755* (2013.01); *B60W 10/20* (2013.01); *B66F 9/07568* (2013.01);
(Continued)

(58) Field of Classification Search
CPC .............. B66F 9/07572; B66F 9/0755; B60W 2554/04; B60W 10/20; B60W 2554/00
See application file for complete search history.

(56) References Cited

U.S. PATENT DOCUMENTS

| | | |
|---|---|---|
| 4,005,838 A | 2/1977 | Grundy |
| 4,660,895 A | 4/1987 | Chlumecky et al. |
| | (Continued) | |

FOREIGN PATENT DOCUMENTS

| | | |
|---|---|---|
| CA | 2941987 A1 | 11/2015 |
| CN | 2328020 Y | 7/1999 |
| | (Continued) | |

OTHER PUBLICATIONS

European Extended Search Report pertaining to Application No. 20200416.4 completed Dec. 17, 2020.
(Continued)

*Primary Examiner* — Diem M Tran
(74) *Attorney, Agent, or Firm* — Dinsmore & Shohl, LLP

(57) ABSTRACT

A materials handling vehicle comprises an operator compartment, a compartment tower, a multi-field scanning tool, and mechanisms that facilitate movement along a travel plane in a warehouse. The tool establishes a scan field, and, within scan field bounds, an occupancy detection field and an obstacle detection field. Tool scanning hardware is configured to generate the scan field from a point of origin that is elevated relative to the operator compartment and to expand the scan field such that it intersects the operator compartment and extends laterally beyond lateral edges of the operator compartment such that the occupancy detection field falls within the operator compartment, the obstacle detection field falls outside of the operator compartment, and the multi-field scanning tool is configured to indicate the
(Continued)

presence of an occupant in the occupancy detection field and obstacles in the obstacle detection field.

15 Claims, 8 Drawing Sheets

Related U.S. Application Data

(60) Provisional application No. 62/380,145, filed on Aug. 26, 2016.

(51) Int. Cl.
    *B60W 10/20*     (2006.01)
    *G05D 1/02*     (2020.01)

(52) U.S. Cl.
    CPC .......... *B66F 17/003* (2013.01); *G05D 1/024* (2013.01); *B60W 2540/215* (2020.02); *B60W 2554/00* (2020.02); *B60W 2710/20* (2013.01); *B66F 9/07572* (2013.01); *G05D 2201/0216* (2013.01)

(56) References Cited

U.S. PATENT DOCUMENTS

| | | | |
|---|---|---|---|
| 4,755,089 A | 7/1988 | Ellgass |
| 4,811,228 A | 3/1989 | Hyyppa |
| 4,846,297 A | 7/1989 | Field et al. |
| 5,111,401 A | 5/1992 | Everett, Jr. et al. |
| 5,295,551 A | 3/1994 | Sukonick |
| 5,524,548 A | 6/1996 | Fox |
| 5,612,883 A | 3/1997 | Shaffer et al. |
| 5,764,014 A | 6/1998 | Jakeway et al. |
| 5,931,254 A | 8/1999 | Loraas |
| 5,970,433 A | 10/1999 | Oka et al. |
| 6,393,362 B1 | 5/2002 | Burns |
| 6,667,592 B2 | 12/2003 | Jacobs et al. |
| 6,784,800 B2 | 8/2004 | Orzechowski |
| 6,799,100 B2 | 9/2004 | Burns et al. |
| 7,073,753 B2 | 7/2006 | Root et al. |
| 7,206,686 B2 | 4/2007 | Sawamoto et al. |
| 7,266,453 B2 | 9/2007 | Sawamoto et al. |
| 7,742,853 B2 | 6/2010 | Mori et al. |
| 7,809,506 B2 | 10/2010 | Kuge et al. |
| 7,826,970 B2 | 11/2010 | Kobayashi et al. |
| 7,925,409 B2 | 4/2011 | Fry et al. |
| 8,050,863 B2 | 11/2011 | Trepagnier et al. |
| 8,169,596 B2 | 5/2012 | Weiss |
| 8,180,514 B2 | 5/2012 | Kaprielian et al. |
| 8,210,791 B2 | 7/2012 | Chilson et al. |
| 8,427,472 B2 | 4/2013 | Moravec |
| 8,485,301 B2 | 7/2013 | Grubaugh et al. |
| 8,538,610 B2 | 9/2013 | Liberatore |
| 8,688,275 B1 | 4/2014 | LaFary et al. |
| 8,725,294 B2 | 5/2014 | Gienger |
| 8,755,035 B2 | 6/2014 | Mizuno et al. |
| 8,965,579 B2 | 2/2015 | Wang et al. |
| 8,965,677 B2 | 2/2015 | Breed et al. |
| 9,168,656 B1 | 10/2015 | Wang et al. |
| 9,310,608 B2 | 4/2016 | Weiss et al. |
| 9,336,684 B2 | 5/2016 | Harasaki |
| 9,410,811 B2 | 8/2016 | Pfaff et al. |
| 2005/0021195 A1 | 1/2005 | Zeitler et al. |
| 2010/0235033 A1 | 9/2010 | Yamamoto et al. |
| 2010/0241289 A1 | 9/2010 | Sandberg |
| 2014/0114526 A1 | 4/2014 | Erb |
| 2014/0210646 A1 | 7/2014 | Subramanya |
| 2014/0278029 A1 | 9/2014 | Tonguz et al. |
| 2015/0221222 A1 | 8/2015 | Hamada et al. |
| 2016/0098648 A1 | 4/2016 | Hannah |
| 2016/0189443 A1 | 6/2016 | Smith |
| 2017/0017236 A1 | 1/2017 | Song et al. |
| 2017/0049288 A1 | 2/2017 | Knutson et al. |
| 2017/0082751 A1 | 3/2017 | Maisonnier et al. |

FOREIGN PATENT DOCUMENTS

| | | |
|---|---|---|
| CN | 105261236 A | 1/2016 |
| DE | 102012008846 A1 | 11/2012 |
| EP | 2848502 A2 | 3/2015 |
| EP | 2952928 A1 | 12/2015 |
| EP | 3139361 A1 | 3/2017 |
| EP | 3202984 A1 | 8/2017 |
| JP | 2006259877 A | 9/2006 |
| JP | 2015227223 A | 12/2015 |
| WO | 2011002478 A2 | 1/2011 |
| WO | 2011022303 A2 | 2/2011 |
| WO | 2016051929 A1 | 4/2016 |
| WO | 2016102130 A1 | 6/2016 |

OTHER PUBLICATIONS

International Search Report and Invitation to Pay Additional Fees pertaining to PCT/US2017/048608 dated Nov. 6, 2017.
Additional International Search Report pertaining to PCT/US2017/048608 dated Feb. 13, 2018.
Benmounah et al., "Obstacle Detection and Decision Making for Intelligent Mobile Robot", p. 537-538.
Bouguerra et al., "An Autonmous Robotic System for Load Transportation", Orebro University and Halmstad University, p. 1-4.
Lengerke et al., "Trajectories and Simulation Model of AGVs with Trailers", ABCM Symposium Series in Mchatronics, 2010, vol. 4, p. 509-518.
Mehrdadi et al., "Design of a Navigation System for Automated Guided Vehicles Operating in a Man-Machine Shared Environment", Transactions on Engineering Sciences, 1997, vol. 16, WIT Press.
Shaikh et al., "AGV Path Planning and Obstacle Avoidance Using Dijkstra's Algorithm", International Journal of Application or Innovation in Engineering & Management (IJAIEM), 2013, 2: 6, p. 77-83.
Yahja et al., "Framed-Quadtree Path Planning for Mobile Robots Operating in Sparse Environments", IEEE Conference on Robotics and Automation (ICRA), Levuen, Belgium, May 1998.
Egemin Automation, AGV Safety Spec Sheet, 2015.
E'gv, Egemin Guided Vehicles Delivered with Excellent Catalog.
Huang et al., "An Intent Inference Based Dynamic Obstacle Avoidance Method of Intelligent Vehicle in Structured Environment", Dec. 6-9, 2015, Robotics and Biomimetics (ROBIO), 2015 IEEE International Conference, DOI: 10.1109/ROBIO.2015.7418977.
University of Alicante (Universitat d'Alacant), "Autonomous Vehicles for Transport of Materials in Warehouse", p. 1-5.
"ASTI helps to optimise material handling operations for Aciturri", Mining, Pack Stack Rack and Roll, Power and Fuel, RFID and IT, Safety at Work, Oct. 11, 2011, MHWmagazine.
Cisco-Eagle, "Preventing a Forklist Collision", 2017.
AutoGuide Mobile Robots, "Man-Aboard Tugger AGVs", Catalog/Spec Sheet, 2017.
Daifuku, "SmartCart—Automatic Guided Cart Installed Systems", Catalog/Spec Sheet, 2015.
Chinese Office Action dated Sep. 18, 2021 for application No. 201780064046.1 filed Aug. 25, 2017.

MULTI-FIELD SCANNING TOOLS IN MATERIALS HANDLING VEHICLES

CROSS-REFERENCE TO RELATED APPLICATIONS

This application is a continuation of U.S. patent application Ser. No. 15/686,597, filed Aug. 25, 2017, which claims the benefit of U.S. Provisional Application Ser. No. 62/380,145 (CEZ 1619 P), filed Aug. 26, 2016, the entireties of which are incorporated by reference herein.

BACKGROUND

The present disclosure relates to object detection and, more particularly, to materials handling vehicles equipped to detect objects in and around the vehicle in a warehouse. For the purposes of defining and describing the concepts and scope of the present disclosure, it is noted that a "warehouse" encompasses any indoor or otherwise covered facility in which materials handling vehicles transport goods including, but not limited to, warehouses intended primarily for the storage of goods, such as those where multi-level warehouse racks are arranged in aisles, and manufacturing facilities where goods are transported about the facility by materials handling vehicles for use in one or more manufacturing processes.

BRIEF SUMMARY

According to the subject matter of the present disclosure is a materials handling vehicle comprising an operator compartment, a compartment tower, a steering mechanism, materials handling hardware, a vehicle drive mechanism, a user interface, and a multi-field scanning tool. The steering mechanism, materials handling hardware, vehicle drive mechanism, and user interface facilitate forward movement of a leading edge the materials handling vehicle, and materials handled by the materials handling vehicle, along a travel plane in a warehouse. The multi-field scanning tool comprises scanning hardware establishing a scan field, an occupancy filter establishing an occupancy detection field within the bounds of the scan field, and an obstacle filter establishing an obstacle detection field within the bounds of the scan field. The operator compartment is elevated relative to the travel plane and comprises a pair of lateral edges that are at least partially non-obstructive to the scan field of the multi-field scanning tool. The scanning hardware of the multi-field scanning tool is configured to generate the scan field from a point of origin that is elevated relative to the operator compartment and to expand the scan field such that it intersects the operator compartment and extends laterally beyond the lateral edges of the operator compartment such that the occupancy detection field established by the occupancy detection filter of the multi-field scanning tool falls within the operator compartment, the obstacle detection field established by the obstacle detection filter of the multi-field scanning tool falls outside of the operator compartment and terminates at the travel plane, and the multi-field scanning tool is configured to indicate the presence of an occupant in the occupancy detection field and obstacles in the obstacle detection field.

In embodiments, the obstacle detection field extends beyond each of the lateral edges of the operator compartment. The obstacle detection field may extend at least about 0.1 m beyond each of the lateral edges of the operator compartment. The multi-field scanning tool may comprise a tower laser residing on the compartment tower. The tower laser may be oriented to project the scan field downwardly into the operator compartment. The scan field may be projected downwardly into the operator compartment at a downward projection angle relative to the compartment tower. The downward projection angle may be between about 0 degrees and about 20 degrees relative to a vertical axis of the compartment tower. The point of origin from which the scan field is generated may reside on the compartment tower. The operator compartment may comprise a leading edge along an operator platform of the operator compartment, opposite the compartment tower, and a trailing edge along the operator platform proximate the compartment tower, and the scan field intersects the operator compartment, along the operator platform, between the leading edge and the trailing edge of the operator compartment. The multi-field scanning tool may comprise adjustable downward projection hardware that is configured to adjust a downward projection angle of the scan field and a location at which the scan field intersects the operator compartment between the leading edge and the trailing edge of the operator compartment. A downward projection angle of the scan field may be between about 0 degrees and about 20 degrees relative to a vertical axis of the compartment tower, and the location along the operator platform at which the scan field intersects the operator compartment between the leading edge and the trailing edge of the operator compartment may be skewed towards the leading edge of the operator compartment. The location along the operator platform at which the scan field intersects the operator compartment may be within about 5 cm of the leading edge of the operator compartment. The occupancy detection field and the obstacle detection field may comprise contiguous portions of the scan field, or the occupancy detection field and the obstacle detection field may comprise non-contiguous portions of the scan field. The occupancy detection field and the obstacle detection field may collectively comprise a portion of the scan field.

In accordance with one embodiment of the present disclosure is a materials handling vehicle comprising a steering mechanism, materials handling hardware, a vehicle drive mechanism, a user interface, a vehicle body, and a multi-field bumper laser assembly. The steering mechanism, materials handling hardware, vehicle drive mechanism, and user interface facilitate forward movement of a leading edge the materials handling vehicle along a travel plane in a warehouse. The multi-field bumper laser assembly comprises a forward-left scanning laser that is positioned to direct a forward-left upright laser field from the leading edge of the materials handling vehicle, a forward-right scanning laser that is positioned to direct a forward-right upright laser field from the leading edge of the materials handling vehicle, an intersecting scanning laser that is positioned to direct an intersecting laser field from the leading edge of the materials handling vehicle, intersecting the forward-right upright laser field and the forward-left upright laser field, and a laser carrier mounted to the vehicle body. The forward-left scanning laser is pivotally coupled to the laser carrier about a forward-left upright pivot axis, the forward-right scanning laser is pivotally coupled to the laser carrier about a forward-right upright pivot axis, and the intersecting scanning laser is pivotally coupled to the laser carrier about an intersecting pivot axis that intersects respective planes of the forward-left upright laser field and the forward-right upright laser field. The multi-field bumper laser assembly further comprises forward-left scanning laser adjustment hardware coupling the forward-left scanning laser to the laser carrier at a position that forces the forward-left scanning laser and the forward-left upright laser field to pivot about the forward-left upright pivot axis upon adjustment, forward-right scanning laser adjustment hardware coupling the forward-right scanning laser to the laser carrier at a position that forces the forward-right scanning laser and the forward-right upright laser field to pivot about the forward-right upright pivot axis upon adjustment, and intersecting laser adjustment hardware coupling the intersecting scanning laser to the laser carrier at a position that forces the intersecting scanning laser and the intersecting laser field to pivot about the intersecting pivot axis upon adjustment.

In embodiments, the forward-left scanning laser adjustment hardware, the forward-right scanning laser adjustment hardware, and the intersecting laser adjustment hardware each comprise a threaded adjustment shaft, an adjustment nut, and a biasing member. The materials handling vehicle may comprise a rear corner laser assembly coupled to a rear corner of a trailing edge of the materials handling vehicle. The materials handling vehicle may comprise a pair of rear corner laser assemblies coupled to respective rear corners of a trailing edge of the materials handling vehicle. The pair of rear corner laser assemblies may be configured to establish respective rear-side laser fields extending past the leading edge and the trailing edge of the materials handling vehicle along respective side edges of the materials handling vehicle.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims.

Figure 1:
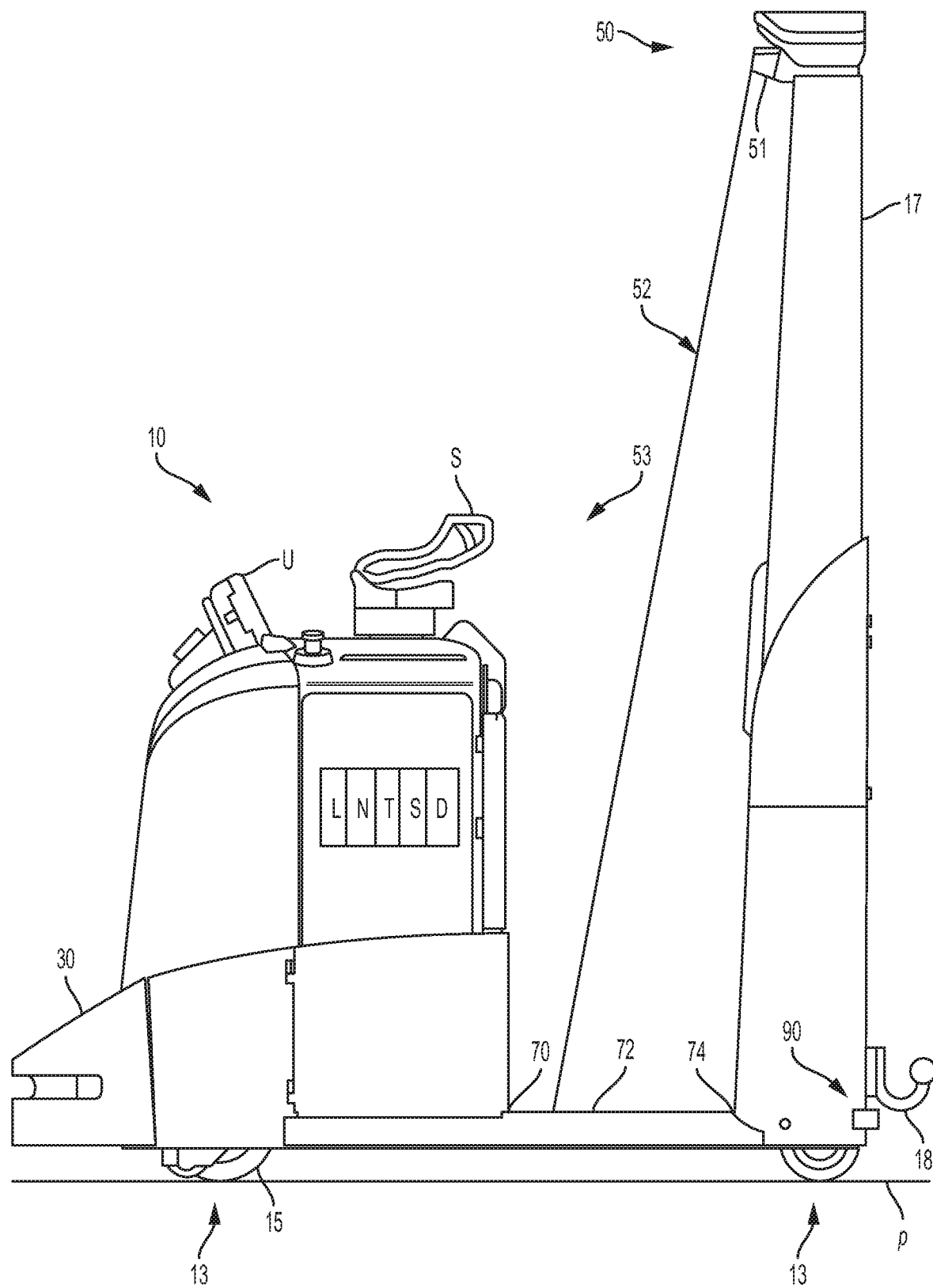
FIG. 1 depicts a materials handling vehicle according to one or more embodiments shown and described herein.

Referring now to FIG. 1, a materials handling vehicle 10 may comprise an operator compartment 53, a compartment tower 17, a steering mechanism S, a vehicle drive mechanism D such as a drive unit 15, a user interface U, a location module L, a navigation module N, a vehicle body, materials handling hardware in the form of a coupling device 18, and a multi-field scanning tool T.

The coupling device 18 of the materials handling hardware may be, for example and not by way of limitation, a hitch, a hook, a pintle hook, lunette eye, a ball hitch, and the like types of towing couplers. It is contemplated that the materials handling vehicle 10 may be any type of materials handling vehicle including, for example, forklifts, lift trucks, tractors, tugger-trailer trains, etc., including, but not limited to those powered industrial trucks identified by the United States Department of Labor, Occupational Safety & Health Administration (OSHA) in Class I—Electric Motor Rider Trucks, Class II Electric Motor Narrow Aisle Trucks, Class III—Electric Motor Hand Trucks or Hand/Rider Trucks, Class IV—Internal Combustion Engine Trucks (Solid/Cushion Tires), Class V—Internal Combustion Engine Trucks (Pneumatic Tires), Class VI—Electric and Internal Combustion Engine Tractors, and Class VII—Rough Terrain Forklift Trucks.

The multi-field scanning tool T may comprise a controller processor communicatively coupled to the drive unit and scanning hardware. The steering mechanism S, materials handling hardware, vehicle drive mechanism D, and user interface U facilitate forward movement of a leading edge the materials handling vehicle 10, and materials handled by the materials handling vehicle 10, along a travel plane p in a warehouse.

The controller processor of the multi-field scanning tool T may be utilized to execute one or more programming instructions with respect to the materials handling vehicle 10 and scanning hardware as described herein. A system for implementing associated computer and software-based methods of the one or more programming instructions may be implemented using a wide area network (WAN), such as an intranet or the Internet. The system may include a workstation including digital systems and other devices permitting connection to and navigation of the network. Various components of the system may be communicatively connected through wired or wireless connections. The one or more programming instructions may be stored in a memory communicatively coupled to one or more controller processors. The memory may be a computer-readable memory that is not a non-transitory signal through may store such signals and may be configured as nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. In some embodiments, the additional controller hardware may comprise logic gates to perform the software instructions as a hardware implementation. The controller processor may be configured as, but not limited to, a general-purpose microcontroller, an application-specific integrated circuit, or a programmable logic controller.

The multi-field scanning tool T may be incorporated into larger systems, and may be able to communicate with external devices and components of such systems via input/output hardware (not shown). The input/output hardware may include any hardware and/or software for sending and receiving data to an external device. Exemplary input/output hardware includes, but is not limited to, universal serial bus (USB), FireWire, Thunderbolt, local area network (LAN) port, wireless fidelity (Wi-Fi) card, WiMax card, and/or other hardware for communicating with other networks and/or external devices.

The multi-field scanning tool T may comprise scanning hardware in the form of, for example, a bumper laser assembly 30, a tower laser assembly 50, and a rear corner laser assembly 90. The compartment tower 17 is coupled to the body of the materials handling vehicle 10 and elevates the tower laser assembly 50 above the operator compartment 53 and a travel plane p of the materials handling vehicle 10. The bounds of the operator compartment 53 of materials handling vehicles 10 contemplated by the present disclosure are defined by those areas of the vehicle that would typically be occupied by the body of an operator of the vehicle.

Figure 2A:
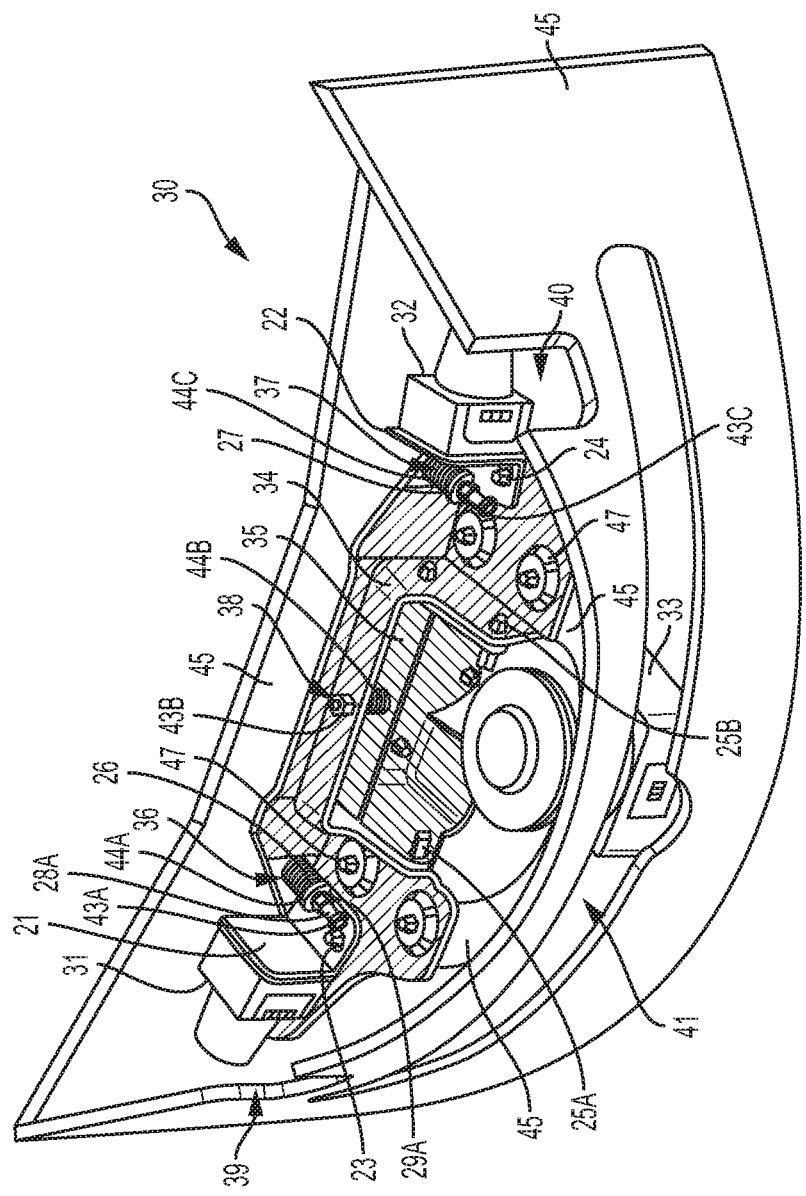
FIGS. 2A and 2B illustrates a bumper laser assembly according to one or more embodiments shown and described herein.
Figure 2B:
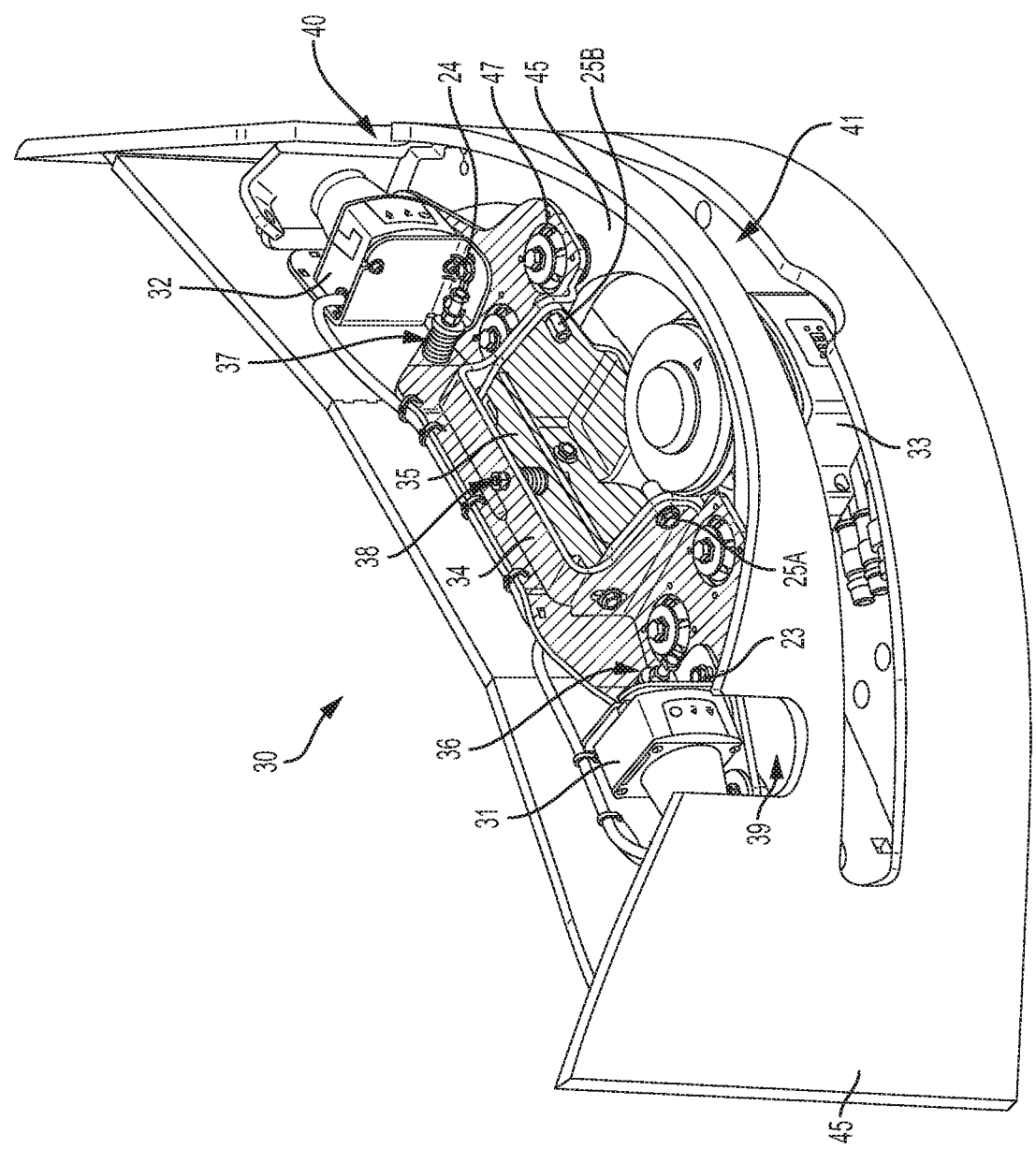
Figure 2C:
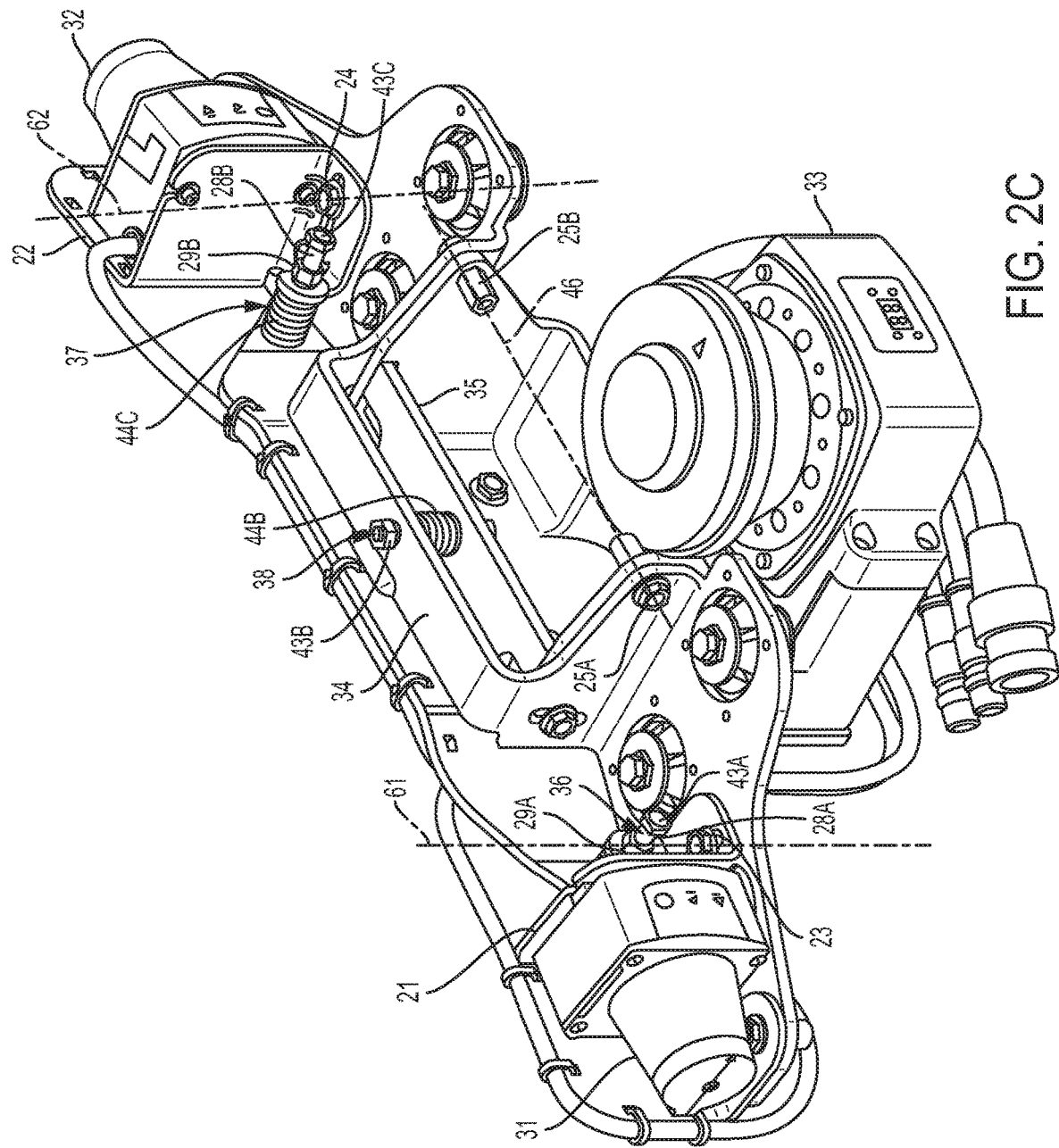
FIG. 2C illustrates a laser carrier according to one or more embodiments shown and described herein.
Figure 7:
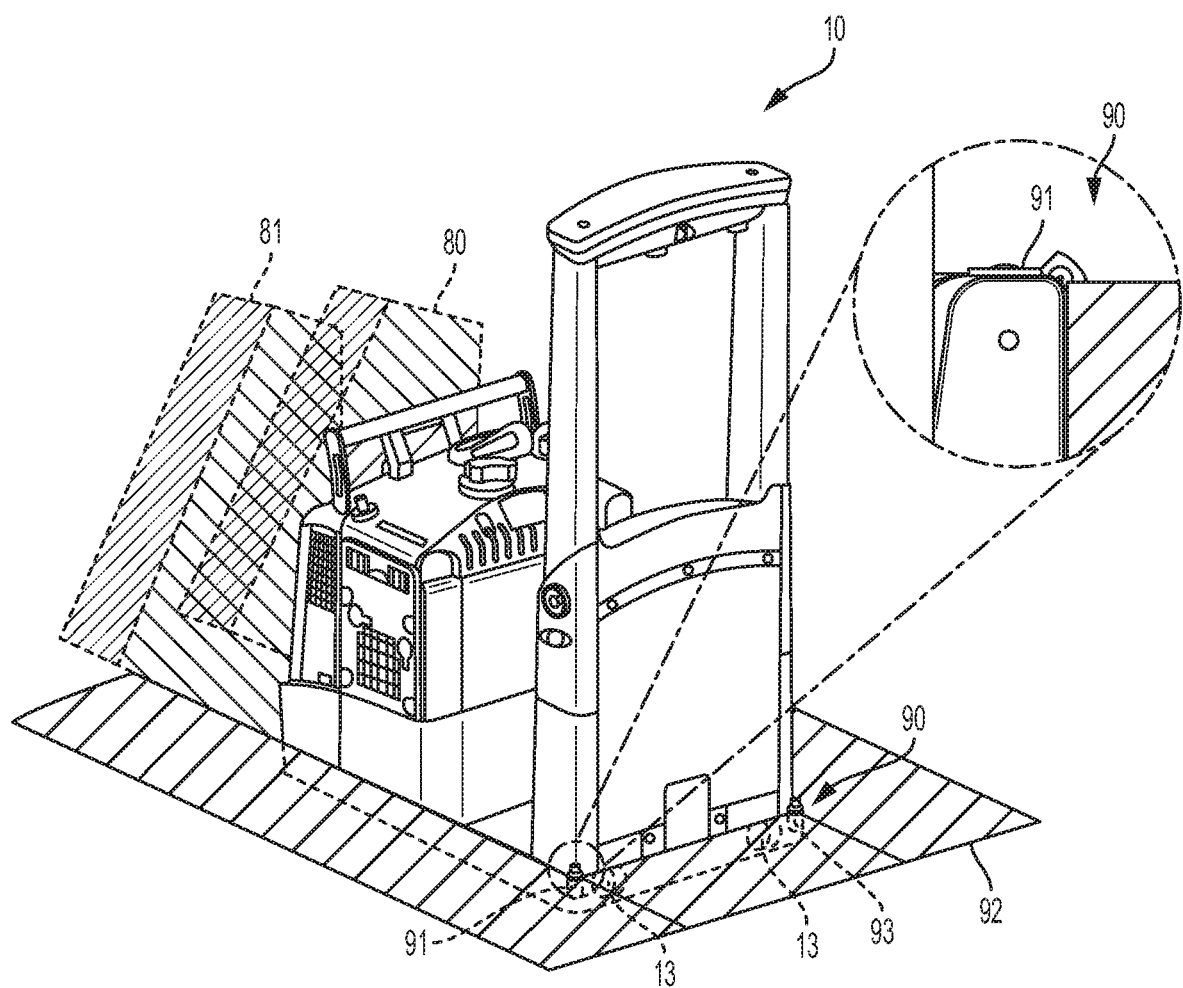
FIG. 7 depicts a rear perspective view of the materials handling vehicle of FIG. 3.

The bumper laser assembly 30, described in greater detail further below with respect to FIGS. 2A-2C, is also coupled to the materials handling vehicle 10 above the travel plane p. However, the bumper laser assembly 30 is elevated at or closer to the travel plane p than the tower laser assembly 50. The rear corner laser assembly 90, described in greater detail further below with respect to FIG. 7, is coupled to the materials handling vehicle 10 above the travel plane p and elevated to a similar elevation as the bumper laser assembly 30.

In embodiments, the multi-field scanning tool comprises scanning hardware establishing a scan field 52, an occupancy filter establishing an occupancy detection field 56 within the bounds of the scan field 52, and an obstacle filter establishing an obstacle detection field 54, 55 within the bounds of the scan field 52. The operator compartment 53 is elevated relative to the travel plane p and includes a pair of lateral edges that are at least partially non-obstructive to the scan field of the multi-field scanning tool T.

The scanning hardware of the multi-field scanning tool T is configured to generate the scan field 52 from a point of origin that is elevated relative to the operator compartment 53 and to expand the scan field 52 such that it intersects the operator compartment 53 and extends laterally beyond the lateral edges of the operator compartment 53 such that the occupancy detection field 56 established by the occupancy detection filter of the multi-field scanning tool T falls within the operator compartment 53, and the obstacle detection field 54, 55 established by the obstacle detection filter of the multi-field scanning tool T falls outside of the operator compartment 53 and terminates at the travel plane p.

The point of origin from which the scan field 52 is generated resides on the compartment tower 17. For example, the multi-field scanning tool T comprises a tower laser 51 residing on the compartment tower 17, and the tower laser 51 is oriented to project the scan field 52 downwardly into the operator compartment 53. The scan field 52 may be projected downwardly into the operator compartment 53 at a downward projection angle Ø' relative to the compartment tower 17. Referring back to FIG. 1, the tower laser assembly 50 comprises a tower laser 51 as scanning hardware which projects a scan field 52 (FIGS. 3-6) at a downward projection angle Ø' (FIG. 6) to intersect with the operator compartment 53 (FIGS. 4 and 6). The downward projection angle Ø' is between about 0 degrees and about 20 degrees relative to a vertical axis of the compartment tower 17.

The operator compartment 53 may include a leading edge 70 along an operator platform 72 of the operator compartment 53, opposite the compartment tower 17, and a trailing edge 74 along the operator platform 72 proximate the compartment tower 17. The scan field 52 may intersect the operator compartment 53 between the leading edge 70 and the trailing edge 74 of the operator compartment 53. The multi-field scanning tool T may include adjustable downward projection hardware that is configured to adjust the downward projection angle Ø' of the scan field 52 and a location along the operator platform 72 at which the scan field 52 intersects the operator compartment 53 between the leading edge 70 and the trailing edge 74 of the operator compartment 53. The location along the operator platform 72 at which the scan field 52 intersects the operator compartment 53 between the leading edge 70 and the trailing edge 74 of the operator compartment 53, along the operator platform 72, may be skewed towards the leading edge 70 of the operator compartment 53. As a non-limiting example, the location along the operator platform 72 at which the scan field 52 intersects the operator compartment 53 is within about 5 cm of the leading edge of the operator compartment.

In embodiments, the obstacle detection field 54, 55 extends beyond each of the lateral edges of the operator compartment 53. The obstacle detection field 54, 55 extends at least about 0.1 m beyond each of the lateral edges of the operator compartment.

Figure 3:
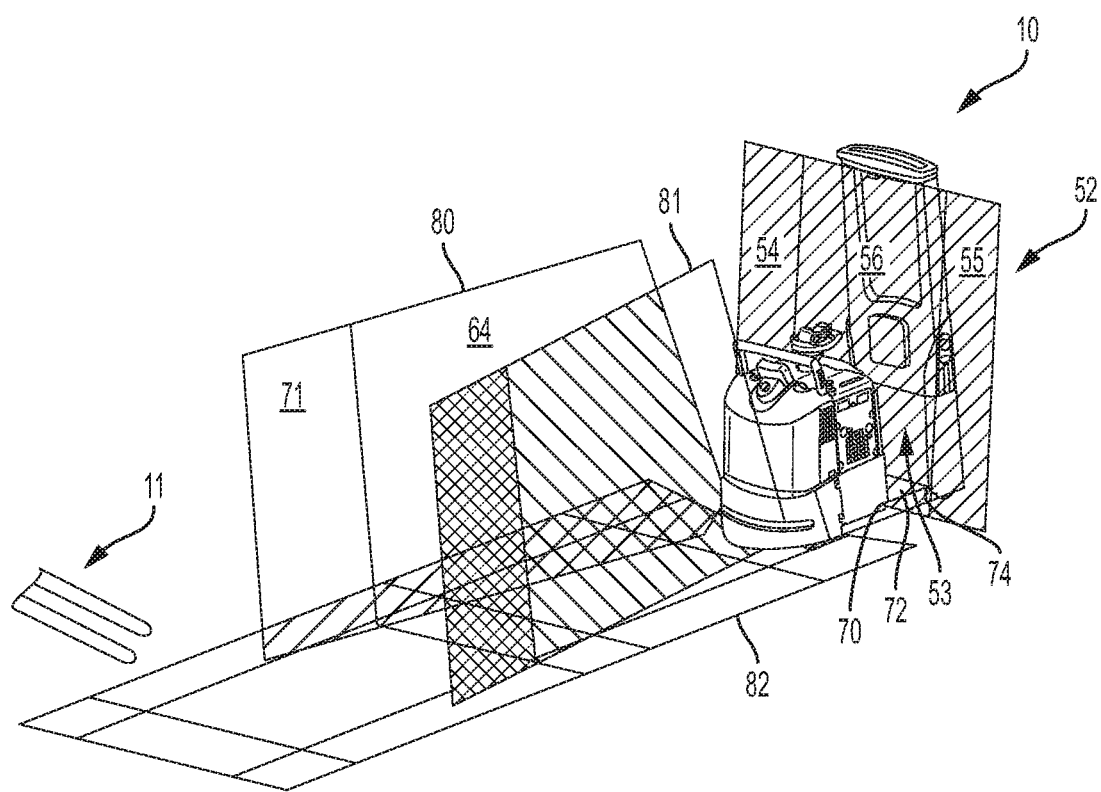
FIG. 3 depicts a materials handling vehicle and associated scanned laser fields according to one or more embodiments shown and described herein.
Figure 4:
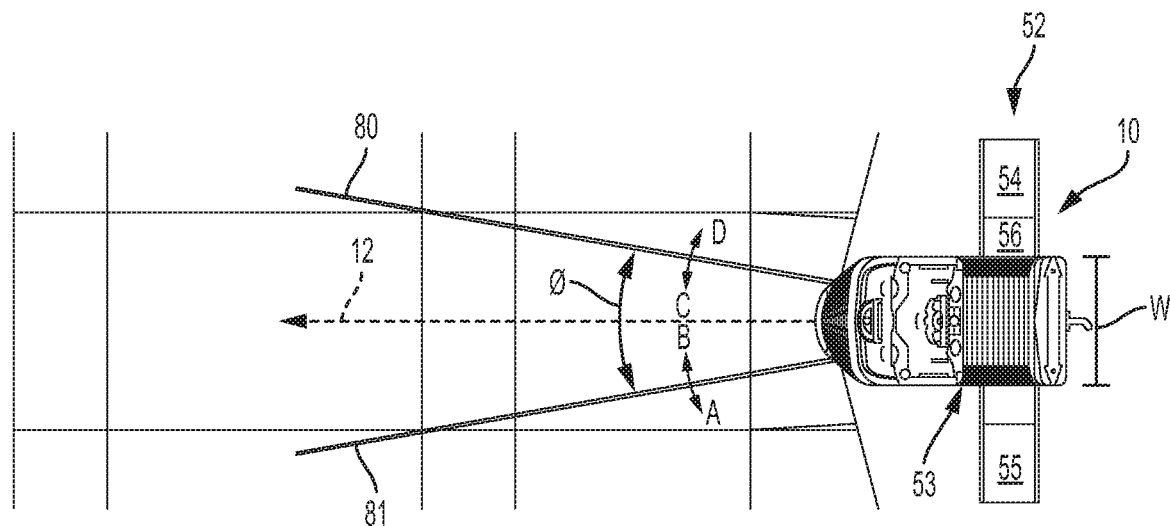
FIG. 4 depicts a top view of the materials handling vehicle of FIG. 3 including a configuration of associated scanned laser fields according to one or more embodiments shown and described herein.

Referring to FIGS. 3 and 4, the scan field 52 comprises two obstacle detection fields 54 and 55 and an occupancy detection field 56. The multi-field scanning tool T (FIG. 1) uses the two obstacle detection fields 54 and 55 to identify objects along the side of, or approaching the side of the materials handling vehicle 10. The occupancy detection field 56 and the obstacle detection fields 54, 55 may be contiguous portions of the scan field 52. Alternatively, the occupancy detection field 56 and the obstacle detection fields 54, 55 may be non-contiguous portions of the scan field 52. The occupancy detection field 56 and the obstacle detection fields 54, 55 may collectively comprise a portion of the scan field 52.

The multi-field scanning tool T is configured to indicate the presence of an occupant in the occupancy detection field 56 and obstacles in the obstacle detection field 54, 55. The multi-field scanning tool T uses the occupancy detection field 56 to identify if an operator is present within the operator compartment 53. It is contemplated that the occupancy detection field 56 may replace occupancy switches, sensors, barriers and the like. It is also contemplated that a single laser will accomplish both the object detection functionality of the two obstacle detection fields 54 and 55 and the occupancy detection field 56.

FIGS. 2A-2C illustrate the bumper laser assembly 30 that comprises a forward-left scanning laser 31, a forward-right scanning laser 32, a intersecting scanning laser 33, a laser carrier 34, a carrier mount 35, a forward-left laser adjustment hardware 36, a forward-right laser adjustment hardware 37, and a intersecting laser adjustment hardware 38. The intersecting scanning laser 33 is coupled to the carrier mount 35. With respect to the terms "forward-left" and "forward-right" within the scope of this disclosure, the respective directional terms are considered with respect to a direction extending from a leading edge to a trailing edge of a component. The forward-left scanning laser 31, the forward-right scanning laser 32, and the carrier mount 35 are coupled to the laser carrier 34. The laser carrier 34 is coupled to either the materials handling vehicle 10 or the bumper cover 45 by two or more bumper mounts 47 to insulate the laser carrier 34 from vibration through operation of the materials handling vehicle 10. In other words, the bumper mounts 47 comprise, for example and not by way of limitation, rubber, springs, shock absorber materials or devices, and the like.

The multi-field bumper laser assembly 30 includes the laser carrier 34 mounted to the vehicle body. The forward-left scanning laser 31 is pivotally coupled to the laser carrier 34 about a forward-left upright pivot axis 61, the forward-right scanning laser 32 is pivotally coupled to the laser carrier 34 about a forward-right upright pivot axis 62, and the intersecting scanning laser 33 is pivotally coupled to the laser carrier 34 about an intersecting pivot axis 46 that intersects respective planes of the forward-left upright laser field 80 and the forward-right upright laser field 81.

The multi-field bumper laser assembly 30 includes the forward-left scanning laser 31 that is positioned to direct a forward-left upright laser field 80 from the leading edge of the materials handling vehicle 10, and the forward-right scanning laser 32 that is positioned to direct a forward-right upright laser field 81 from the leading edge of the materials handling vehicle 10. The multi-field bumper laser assembly 30 further includes the intersecting scanning laser 33 that is positioned to direct an intersecting laser field 82 from the leading edge of the materials handling vehicle 10, intersecting the forward-right upright laser field 81 and the forward-left upright laser field 80.

The forward-left scanning laser 31 is adjustable via the forward-left laser adjustment hardware 36 around the forward-left upright pivot axis 61, the forward-right scanning laser 32 is adjustable via the forward-right laser adjustment hardware 37 around the forward-right upright pivot axis 62, and the carrier mount 35, and thus the intersecting scanning laser 33, is adjustable by the intersecting laser adjustment hardware 38 around the intersecting pivot axis 46.

Thus, the multi-field bumper laser assembly 30 includes forward-left scanning laser adjustment hardware 36 coupling the forward-left scanning laser 31 to the laser carrier 34 at a position that forces the forward-left scanning laser 31 and the forward-left upright laser field 80 to pivot about the forward-left upright pivot axis 61 upon adjustment. Further, the multi-field bumper laser assembly 30 includes forward-right scanning laser adjustment hardware 37 coupling the forward-right scanning laser 32 to the laser carrier 34 at a position that forces the forward-right scanning laser 32 and the forward-right upright laser field 81 to pivot about the forward-right upright pivot axis 62 upon adjustment. Additionally, the multi-field bumper laser assembly 30 includes intersecting laser adjustment hardware 38 coupling the intersecting scanning laser 33 to the laser carrier 34 at a position that forces the intersecting scanning laser 33 and the intersecting laser field 82 to pivot about the intersecting pivot axis 46 upon adjustment.

The forward-left scanning laser adjustment hardware 36, the forward-right scanning laser adjustment hardware 37, and the intersecting laser adjustment hardware 38 each comprise a threaded adjustment shaft 28, an adjustment nut 43, and a biasing member 44. The biasing member 44 may be, for example, a helical spring, a coil spring, a leaf spring, or a like biasing component. While an adjustment nut 43 is described, an adjustment member configured to adjust the forward-left scanning laser adjustment hardware 36, the forward-right scanning laser adjustment hardware 37, and the intersecting laser adjustment hardware 38 about a respective pivot axis with respect to the laser carrier 34 as described herein is within the scope of this disclosure.

As a non-limiting example, the forward-left laser adjustment hardware 36 includes an adjustable adjustment nut 43A along a front portion of a threaded adjustment shaft 28A, and an inner nut 29A disposed against a front wall of a washer 26 at a central portion of the shaft 28A. The biasing member 44A is disposed against a rear wall of the washer 26 and a rear wall of the laser carrier 34. Further, the washer 26 is attached to a laser mount 21 and is protruding upwardly from the laser mount 21. While a washer 26 is described to cooperate with the forward-left laser adjustment hardware 36 to attach the adjustable laser mount 21 to the stationary laser carrier 34, other connection mechanisms to provide pivotable adjustment between the forward-left scanning laser 31 and the stationary laser carrier 34 are contemplated within the scope of this disclosure. The forward-left scanning laser 31 is coupled to the laser mount 21. Thus, adjustment of the adjustable adjustment nut 43A will cause a compression of the biasing member 44A and will pivot the laser mount 21 with respect to the rear wall of the stationary laser carrier 34 about a pivot point 23.

The forward-right laser adjustment hardware 37 includes an adjustable adjustment nut 43C along a front portion of a threaded adjustment shaft 28B, an inner nut 29B disposed against a front wall of a washer 27 at a central portion of the shaft 28B. The biasing member 44C is disposed against a rear wall of the washer 27 and a rear wall of the laser carrier 34. Further, the washer 27 is attached to a laser mount 22 and is protruding upwardly from the laser mount 22. While a washer 27 is described to cooperate with the forward-right laser adjustment hardware 37 to attach the adjustable laser mount 22 to the stationary laser carrier 34, other connection mechanisms to provide pivotable adjustment between the forward-right scanning laser 32 and the stationary laser carrier 34 are contemplated within the scope of this disclosure. The forward-right scanning laser 32 is coupled to the laser mount 22. Thus, adjustment of the adjustable adjustment nut 43C will cause a compression of the biasing member 44C and will pivot the laser mount 22 with respect to the rear wall of the stationary laser carrier 34 about a pivot point 24.

The intersecting laser adjustment hardware 38 includes a threaded adjustment shaft disposed between apertures defined in top walls of the laser carrier 34 and the carrier mount 35, and an adjustable adjustment nut 43B disposed about a top portion of the threaded adjustment shaft against a top portion of a top wall of the laser carrier 34. The intersecting laser adjustment hardware 38 further includes a biasing member 44B that is disposed about a central portion of the threaded adjustment shaft between a bottom portion of the top wall of the laser carrier 34 and a top portion of a top wall of the carrier mount 35. The intersecting scanning laser 33 is coupled to the carrier mount 35. Thus, adjustment of the adjustable adjustment nut 43B will cause a compression of the biasing member 44B and will pivot the carrier mount 35 with respect to interior side walls of the stationary laser carrier 34 about pivot points 25A, 25B at which the carrier mount 35 is attached to the interior side walls of the stationary laser carrier 34.

The bumper laser assembly 30 may comprise a bumper cover 45 with a forward-left slit 39, a forward-right slit 40, and a horizontal slit 41. It is contemplated that the bumper cover 45 may be made from a robust material to endure an impact with another vehicle or structure. The forward-left scanning laser 31 projects a forward-left upright laser field 80 (FIG. 3) through the forward-left slit 39. The forward-right scanning laser 32 projects a forward-right upright laser field 81 (FIG. 3) through the forward-right slit 40 and the intersecting scanning laser 33 projects a intersecting laser field 82 (FIG. 3) through the horizontal slit 41. The three scanned laser fields, i.e., the forward-left upright laser field 80, the forward-right upright laser field 81, and the intersecting laser field 82, are adjustable through manipulation of the forward-left laser adjustment hardware 36, the forward-right laser adjustment hardware 37, and the intersecting laser adjustment hardware 38. Specifically, it is contemplated that an angle Ø (FIG. 4) between the forward-left upright laser field 80 and the forward-right upright laser field 81 may be increased, decreased, or kept the same but rotated through adjustment of the forward-left laser adjustment hardware 36 and the forward-right laser adjustment hardware 37 either together or individually.

The forward-left laser adjustment hardware 36 comprises an adjustment nut 43 and a biasing member 44 which serves to rotate the forward-left upright laser field 80 in a sweep C-D (FIG. 4). The biasing member 44 exerts a biasing force which allows for fine movement of the adjustment nut 43 and therefore, fine adjustment of the forward-left upright laser field 80 in the sweep C-D. Likewise, the forward-right laser adjustment hardware 37 serves to rotate the forward-right upright laser field 81 in a sweep A-B and the intersecting laser adjustment hardware 38 serves to rotate the intersecting laser field 82 in a sweep E-F (FIG. 6). Course adjustment of the forward-left scanning laser 31, the forward-right scanning laser 32, and the intersecting scanning laser 33 may be made through the coupling of the laser carrier 34 to the materials handling vehicle 10 or the bumper cover 45.

Figure 5:
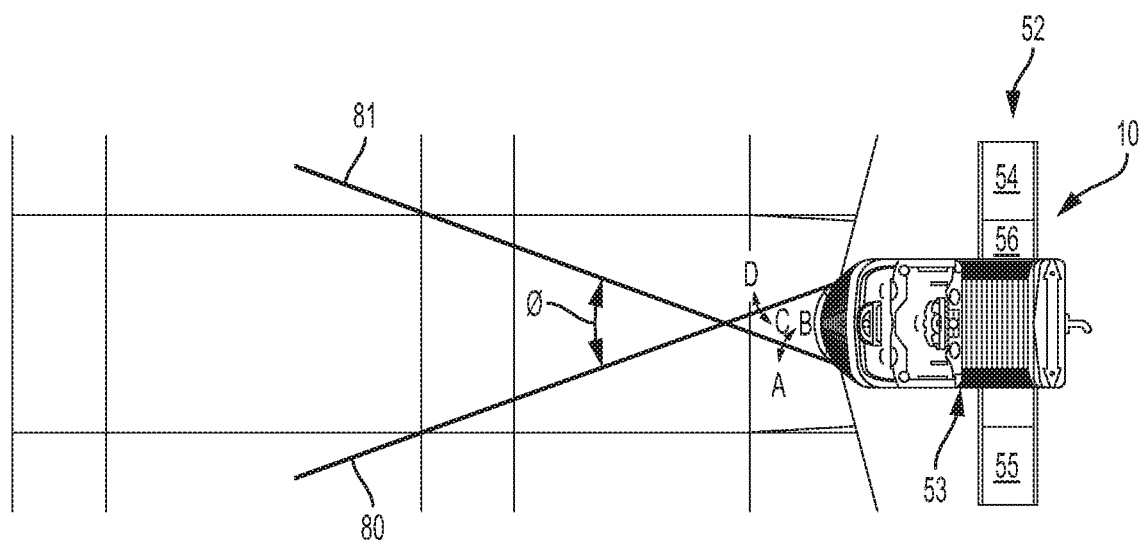
FIG. 5 depicts another top view of the materials handling vehicle of FIG. 3 including another configuration of associated scanned laser fields according to one or more embodiments shown and described herein.
Figure 6:
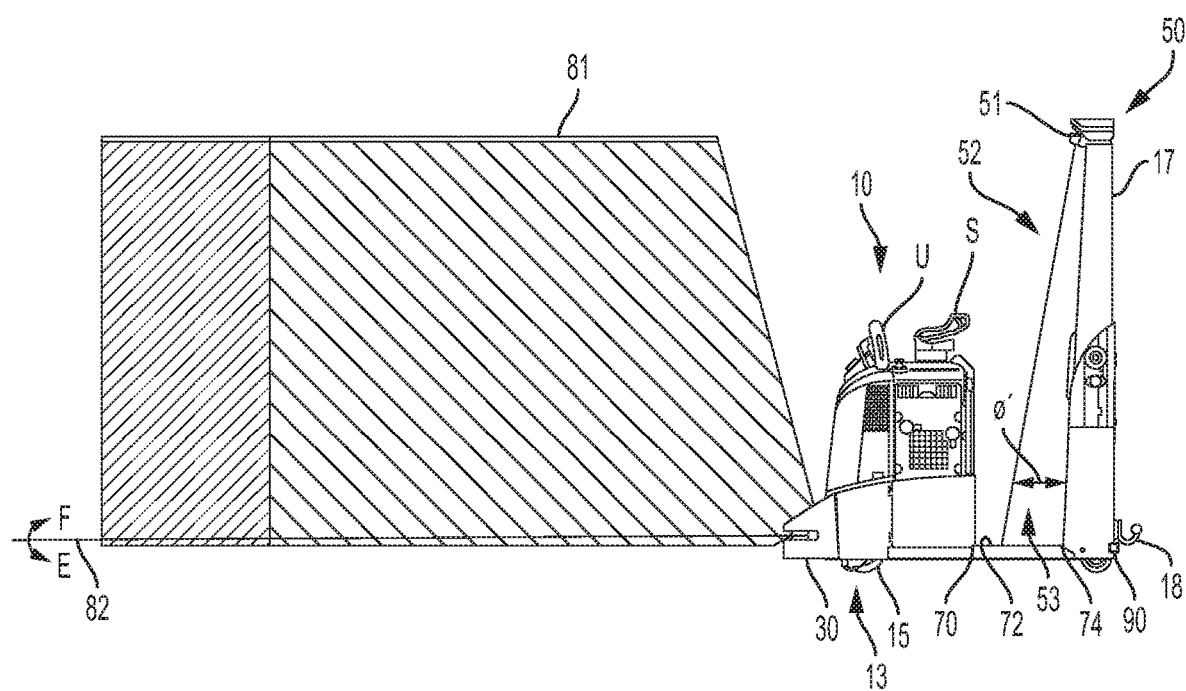
FIG. 6 depicts a side elevation view of the materials handling vehicle of FIG. 3.

Referring now to FIGS. 3-6, the intersecting laser field 82 is used by the multi-field scanning tool T (FIG. 1) to identify obstacles along the travel plane p (FIG. 1). However, it is contemplated that the intersecting laser field 82 may not detect objects (e.g., forks 11; FIG. 3) protruding into the path 12 (FIG. 4) of the materials handling vehicle 10 if they are situated above the intersecting laser field 82. The forward-left upright laser field 80 and the forward-right upright laser field 81 are vertically oriented scanned laser fields to identify any objects that may be situated outside (i.e., above or below) of the intersecting laser field 82 but along the path 12 of the materials handling vehicle 10. It is contemplated that the angle Ø (FIG. 4) may be adjusted such that the forward-left upright laser field 80 and the forward-right upright laser field 81 will accommodate the width W (FIG. 4) of the materials handling vehicle 10 and/or any loads carried by and/or trailers pulled by the materials handling vehicle 10. It is also contemplated that the forward-left upright laser field 80 and the forward-right upright laser field 81 project forward enough to allow for adequate stopping distance should an object be detected by either scanned laser field. It is contemplated that because of the vertical nature of each plane, the forward-left scanning laser 31 and the forward-right scanning laser 32 do not need to be adjusted as the tires 13 (FIG. 1) wear over time to maintain their projections along the path 12. FIG. 5 illustrates another embodiment of the forward-left upright laser field 80 and the forward-right upright laser field 81 crossing in front of the materials handling vehicle 10 to provide additional obstacle detection coverage directing along the path 12 and in front of the materials handling vehicle 10.

Referring to FIG. 7, the materials handling vehicle 10 may include a rear corner laser assembly 90 coupled to a rear corner of a trailing edge of the materials handling vehicle 10. Further, the materials handling vehicle 10 may include a pair of rear corner laser assemblies 90 coupled to respective rear corners of a trailing edge of the materials handling vehicle. The pair of rear corner laser assemblies 90 are configured to establish respective rear-side laser fields 92 extending past the leading edge and the trailing edge of the materials handling vehicle 10 along respective side edges of the materials handling vehicle 10.

As a non-limiting example, the rear corner laser assembly 90 is configured to generate respective rear-side laser fields 92 that is used by the multi-field scanning tool T (FIG. 1) to identify obstacles along the travel plane p (FIG. 1). The rear corner laser assembly 90 is coupled the trailing edge of the materials handling vehicle 10 and may include a rear corner laser. For example, the pair of rear corner laser assemblies 90 may include a pair of rear corner lasers 91, 93 coupled to and protruding from respective rear corners of the trailing edge of the materials handling vehicle 10.

The pair of rear corner lasers 91, 93 may be disposed above the travel plane p and above one or more wheels such as tires 13 of the materials handling vehicle 10. The pair of rear corner lasers 91, 93 may be configured to establish respective rear-side laser fields 92 that are at least disposed past the leading edge and the trailing edge of the materials handling vehicle 10 along a respective side edge of the materials handling vehicle 10. In embodiments, the pair of rear corner lasers 91, 93 may be configured to establish a rear horizontal scan field disposed therebetween and past the trailing edge of the materials handling vehicle 10. The pair of rear corner lasers 91, 93 may respectively include adjustment hardware as described herein that is configured to be manipulated to adjust a respectively coupled laser 91, 93 and affect a corresponding adjustment of a corresponding, respective rear-side laser field 92.

It is contemplated that the operations of the materials handling vehicle 10 can be dependent upon whether an object is detected by any of the aforementioned scanned laser fields, e.g., the forward-left upright laser field 80, the forward-right upright laser field 81, the intersecting laser field 82, and the scan field 52 according to any conventional, or yet-to-be developed, materials handling vehicle control scheme. It is further contemplated that the respective laser fields may be subdivided so that objects detected in different portions of the subdivided laser field will be treated or used to affect the operations of the materials handling vehicle in different ways. For example, and not by way of limitation, referring to FIG. 3, the forward-left upright laser field 80 may be subdivided into fields 64 and 71.

It is also contemplated that, although the scanned laser fields of the present disclosure are illustrated as substantially planar laser fields, the fields may deviate from a precisely planar configuration without departing from the scope of the present application.

It is noted that the term "sensor," as used herein, means a device that measures a physical quantity and converts it into a signal which is correlated to the measured value of the physical quantity. Furthermore, the term "signal" means an electrical, magnetic or optical waveform, such as current, voltage, flux, DC, AC, sinusoidal-wave, triangular-wave, square-wave, and the like, capable of being transmitted from one location to another.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Certain terminology is used in the disclosure for convenience only and is not limiting. Words like "left," "right," "front," "back," "upper," "lower," etc., designate directions in the drawings to which reference is made. The terminology includes the words noted above as well as derivatives thereof and words of similar import.

It is noted that, while aspects of the present disclosure may be presented as being performed in a particular sequence in the depicted embodiments, the functions can be performed in an alternative order without departing from the scope of the present disclosure. It is furthermore noted that one or more of these aspects can be omitted without departing from the scope of the embodiments described herein.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A materials handling vehicle comprising
    an operator compartment,
    a compartment tower,
    a steering mechanism,
    materials handling hardware,
    a vehicle drive mechanism,
    a user interface, and
    a multi-field scanning tool, wherein:
    the steering mechanism, materials handling hardware, vehicle drive mechanism, and user interface facilitate forward movement of a leading edge the materials handling vehicle, and materials handled by the materials handling vehicle, along a travel plane in a warehouse;
    the multi-field scanning tool comprises scanning hardware establishing a scan field, an occupancy filter establishing an occupancy detection field within the bounds of the scan field, and an obstacle filter establishing an obstacle detection field within the bounds of the scan field, the occupancy detection field aligned with the obstacle detection field along a laterally extending horizontal axis, the laterally extending horizontal axis perpendicular to a front-to-rear axis that intersects a front and rear of the materials handling vehicle;
    the operator compartment is elevated relative to the travel plane and comprises a pair of lateral edges that are at least partially non-obstructive to the scan field of the multi-field scanning tool;
    the scanning hardware of the multi-field scanning tool is configured to generate the scan field from a point of origin that is elevated relative to the operator compartment and to expand the scan field such that it intersects the operator compartment and extends laterally beyond the lateral edges of the operator compartment such that
        the occupancy detection field established by the occupancy detection filter of the multi-field scanning tool falls within the operator compartment, and
        the obstacle detection field established by the obstacle detection filter of the multi-field scanning tool falls outside of the operator compartment and terminates at the travel plane; and
    the multi-field scanning tool is configured to indicate the presence of an occupant in the occupancy detection field and obstacles in the obstacle detection field.

2. The materials handling vehicle of claim 1, wherein the obstacle detection field extends beyond each of the lateral edges of the operator compartment, and wherein the scan field comprises the occupancy detection field disposed between and contiguous with two laterally extending obstacle detection fields.

3. The materials handling vehicle of claim 1, wherein the obstacle detection field extends at least about 0.1 m beyond each of the lateral edges of the operator compartment.

4. The materials handling vehicle of claim 1, wherein the multi-field scanning tool comprises a tower laser residing on the compartment tower.

5. The materials handling vehicle of claim 4, wherein the tower laser is oriented to project the scan field downwardly into the operator compartment.

6. The materials handling vehicle of claim 5, wherein the scan field is projected downwardly into the operator compartment at a downward projection angle relative to the compartment tower.

7. The materials handling vehicle of claim 6, wherein the downward projection angle is between about 0 degrees and about 20 degrees relative to a vertical axis of the compartment tower.

8. The materials handling vehicle of claim 1, wherein the point of origin from which the scan field is generated resides on the compartment tower.

9. The materials handling vehicle of claim 1, wherein:
the operator compartment comprises a leading edge along an operator platform of the operator compartment, opposite the compartment tower, and a trailing edge along the operator platform proximate the compartment tower; and
the scan field intersects the operator compartment, along the operator platform, between the leading edge and the trailing edge of the operator compartment.

10. The materials handling vehicle of claim 9, wherein the multi-field scanning tool comprises adjustable downward projection hardware that is configured to adjust a downward projection angle of the scan field and a location at which the scan field intersects the operator compartment between the leading edge and the trailing edge of the operator compartment.

11. The materials handling vehicle of claim 9, wherein:
a downward projection angle of the scan field is between about 0 degrees and about 20 degrees relative to a vertical axis of the compartment tower; and
the location along the operator platform at which the scan field intersects the operator compartment between the leading edge and the trailing edge of the operator compartment is skewed towards the leading edge of the operator compartment.

12. The materials handling vehicle of claim 11, wherein the location along the operator platform at which the scan field intersects the operator compartment is within about 5 cm of the leading edge of the operator compartment.

13. The materials handling vehicle of claim 1, wherein the occupancy detection field and the obstacle detection field comprise contiguous portions of the scan field.

14. The materials handling vehicle of claim 1, wherein the occupancy detection field and the obstacle detection field comprise non-contiguous portions of the scan field.

15. The materials handling vehicle of claim 1, wherein the occupancy detection field and the obstacle detection field collectively comprise a portion of the scan field.

* * * * *